United States Patent
Broyer

[15] 3,672,718
[45] June 27, 1972

[54] AUTOMOBILE BODIES

[72] Inventor: Robert Broyer, Billancourt, France
[73] Assignee: Regie Nationale Des Usines Renault, Billancourt (Hauts de Seine), France
[22] Filed: June 1, 1970
[21] Appl. No.: 42,136

[30] Foreign Application Priority Data

June 16, 1969 France ............................... 6919907

[52] U.S. Cl. .............................................. 296/1 S, 296/28 R
[51] Int. Cl. ........................................................... B62d 35/00
[58] Field of Search ............................ 296/1 S, 28 R, 28 K

[56] References Cited

UNITED STATES PATENTS

| | | | |
|---|---|---|---|
| 2,967,073 | 1/1961 | Gagliardi | 296/28 R |
| D200,703 | 3/1965 | Thomas | D14/3 |
| 2,886,373 | 5/1959 | Barneyi | 296/28 |
| D213,615 | 3/1969 | Tyrrell | D14/3 |

FOREIGN PATENTS OR APPLICATIONS 1,148,887 5/1963 Germany .............................. 296/28 K Primary Examiner—Benjamin Hersh
Assistant Examiner—Leslie J. Paperner
Attorney—Stevens, Davis, Miller and Mosher

[57] ABSTRACT

A body of automotive vehicle, and more particularly of mass-produced passenger vehicle, characterized in that its general configuration comprises two opposed irregular frustums of pyramid with non-parallel bases, assembled at their major bases, one frustum having an elongated shape converging to the front to constitute the passenger compartment and the front portion of the vehicle, its minor base constituting the front face and its major base corresponding to the greater cross-section of the vehicle body, which is located substantially at the rear of said passenger compartment, the other frustum being shorter and converging sharply to the rear, with the minor base constituting the rear end face of the vehicle and major base coplanar with that of the first or front frustum of pyramid, the perimeter of this major base following a contour slightly parallel to that the major base of said one frustum but being slightly recessed in relation thereto in order to provide a continuous, sharp-edged shoulder along the perimeter of said major base, on the faces corresponding to the roof and to the upper portion of the side panels of the body.

8 Claims, 4 Drawing Figures

PATENTED JUN 27 1972　　　　　　　　　　　　　　　3,672,718

AUTOMOBILE BODIES

This invention relates in general to automobile bodies and more particularly to a body specially designed for a passenger vehicle to be mass produced and having a shape capable of assisting greatly in promoting the vehicle stability and road adherence at high speed.

The trend in developing high road speeds with modern automotive vehicles, due to technical improvements achieved in the motor industry and to the increment in the available mileage of motorways, speedways and superhighways has set in sharp contrast the increasingly predominant role played by body styling in the achievement of road stability and safety of the vehicle at high speed.

The present technical trend is directed inter alia to a gradual reduction in the vehicle weight. Now although modern vehicles have in many cases cruising speeds equivalent to those of light aircrafts, a motorcar remains essentially a vehicle "propelled" by the action of the driving wheels on the road surface; hence the necessity of obtaining a good road adherence.

The shapes of car bodies developed on aerodynamic principles up to now showed mainly the desired to reduce the drag factor. The result was the development of bodies having a conventional aerodynamic profile with rounded front and surfaces converging and inclined to the rear in order to reduce head-resistance and drag. These shapes constituting a tentative approach to aircraft profile create at high speed a "lift" which, while constituting a desired effect in a heavier-than-air flying machine, is particularly detrimental to the stability of an automobile driven at high speed.

An attempt to reduce this effect consisted in designing passenger car bodies having "nose-dive" bonnets with a view to apply an air overpressure to the surface of these bonnets so as to increase the road adherence of the front portion of the vehicle.

Another attempt was made with a view to reduce the lift effect exerted on the rear portion of the vehicle by using spoilers or turbulence fins which, when mounted close to the vehicle surface, create aerodynamic turbulences tending to break down airflows away from this surface and to reduce the lift effect, as suggested for instance in the U.S. Pat. application, Ser. No. 688.224 of Dec. 5, 1967, now U.S. Pat. No. 3,529,862. However, this solution is objectionable in that it increases the head resistance of the vehicle due to the increment in its front surface area.

Modern vehicles designed for relatively high speeds, say above 85 m. p. h., constitute a compromise between front nose-dive styling, concerning chiefly the bonnet and windscreen surface, which aim at increasing the road adherence, and a streamlined fastback for reducing drag. The passenger compartment or central portion of the vehicle preserves a substantially parallelepipedic configuration, with a roof sometimes slightly inclined to the rear. The maximum front cross-section of the vehicle lies as a rule in a vertical plane perpendicular to the longitudinal center line of the vehicle and intersecting this line substantially in the middle of the passenger compartment or slightly behind the windscreen area.

The detrimental lift effects at high speed are usually compensated by the weight of the vehicle, which entails in turn a greater engine power output. This leads to the manufacture of so-called sports cars of generally high cost and therefore limited diffusion.

It is the essential object of the present invention to provide a body for a popular passenger vehicle which has a styling so designed as to ensure a maximum stability and safety at high speed, independently of the weight of the vehicle, as well as a good insensitiveness to side wind and eddies, with a minimum lift and a maximum aerodynamic bearing pressure on the road surface.

This vehicle body has basically the general configuration of two opposed irregular frustums of pyramids with non-parallel bases and assembled at their major bases, one frustum having an elongated shape converging to the front to constitute the passenger compartment and the front portion of the vehicle, its minor base constituting the front face and its major base corresponding to the greater cross-section of the vehicle body, which is located substantially at the rear of said passenger compartment, the other frustum being shorter and converging sharply to the rear, with the minor base constituting the rear end face of the vehicle and the major base coplanar with that of the first or front frustum of a pyramid, the perimeter of this major base following a contour slightly parallel to that of the major base of said one frustum but being slightly recessed in relation thereto in order to provide a continuous, sharp-edged shoulder along the perimeter of said major base, on the faces corresponding to the roof and to upper portions of the side panels of the body.

Another feature characterizing the body according to this invention lies in the provision of a third irregular frustum of a pyramid having non-parallel bases and a flattened configuration, with the minor base constituting the roof of the passenger compartment and the major base constituting the contour of the maximum surface area of the vehicle as seen in floor projection from above, said major base lying in a substantially horizontal plane relatively close to the base or lower edge of the car body.

A further feature characterizing the body of this invention lies in the fact that the line constituting the upper and side contours of the rear window extend in sharp angular relationship to the surface of the roof and side panels of the passenger compartment, and is substantially parallel, rearwardly, to the contour of the sharp-edged shoulder embodying the common base of the two structures having the shape of opposed frustums of pyramids and comprising the maximum cross-section of the vehicle.

The aeroflow extractors of the passenger compartment are advantageously disposed just behind the aforesaid sharp-edged shoulder, so as to open in the depression zone created thereby.

As a result of this novel combination of shapes the surfaces of the bonnet, windscreen, passenger compartment's roof and upper side panels of the front portion and of the passenger compartment converge forwards and receive during the drive a pressure due to the air-resistance which tends to press the vehicle against the road surface. This pressure is inasmuch efficient as it is exerted on a large surface area. Moreover, the pressure exerted on the side panels has a horizontal component perpendicular to the longitudinal center line of the vehicle, which counteracts the effects of eddies and side wind on the stability of the vehicle while reducing the resistance to these effects due to the inclination of said surfaces.

The sharp-edged shoulder corresponding to the maximum cross-section of the vehicle produces a turbulent air flow reinforced by the sharp angle between this shoulder and the adjacent rear window parallel to said shoulder, thus breaking airflows off the rear portion and reducing the lift effect produced by this portion. This effect is further reduced by the pronounced convergence of the surfaces of said rear portion.

The aeroflow vents or extractors from the passenger compartment open into the depression area behind said sharp-edged shoulder and assist in providing an efficient ventilation of the passenger compartment.

The inclination of the upper portion of the side panels is attended by a recessed position of the side edges of the roof, thus facilitating the access to the passenger compartment.

As this body shape has its widest portion nearly coplanar with the rear wheel axes, the rear track can be increased with respect to the front track, thus ensuring an improved stability and wheel adherence, notably when negotiating turns or on muddy or snow-covered roads.

The rearward rising canopy increases the headroom and therefore the comfort of rear seat passengers.

Finally, this body shape, from which all rounded pressings are strictly precluded, and comprising only flat surfaces or at the most very slightly curved surfaces, eliminates costly deep pressings and therefore this body can be constructed economically under mass-production conditions to which it is perfectly adapted.

It is therefore obvious that with this combination it is possible to construct a mass-produced vehicle capable of extremely lively performances heretofore reserved for considerably more expansive cars.

Safety is increased by the great structural rigidity resulting from the pyramidal shapes and their high crushing strength.

A typical form of embodiment of a body according to this invention will now be described more in detail with reference to the accompanying drawing. Of course, the invention should not be strictly limited by the shapes and proportions given in this example by way of illustration, for it is also applicable to any construction including the same structural characteristics.

Figure 1:
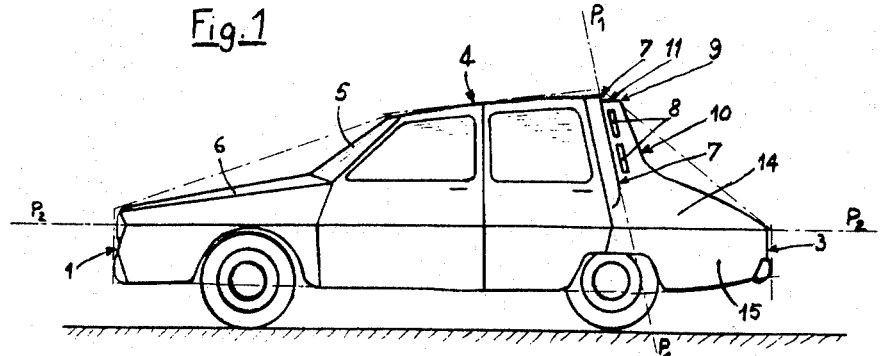
FIG. 1 is a side elevational view of a vehicle provided with the body constituting the subject-matter of this invention.

Referring first to FIG. 1, it will be seen that the dash and dot lines drawn around the body designates on the one hand the irregular front frustum of a pyramid of which the minor base is the front face 1 and the major base 2 the maximum cross-section of the vehicle which lies in the plane $P_1P_1$, and on the other hand the rear irregular frustum of a pyramid of which the major base lies in the same plane $P_1P_1$ and the minor base is the rear end face 3.

Figure 2:
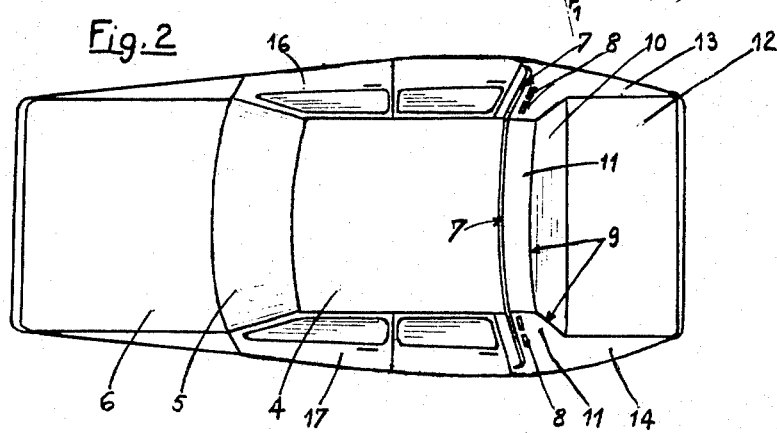
FIG. 2 is a plan view from above of the same body.
Figure 3:
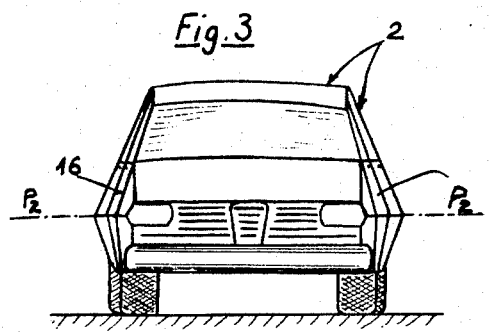
FIG. 3 is a front view of the vehicle.
Figure 4:
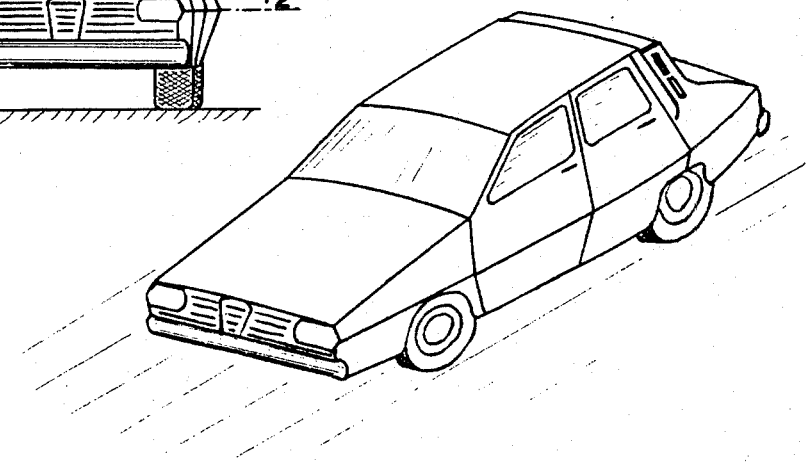
FIG. 4 is a perspective view of the vehicle.

Furthermore, the body comprises a third irregular and considerably flattened frustum of a pyramid of which the minor base is the roof of the passenger compartment 4 and the major base the contour of the maximum surface of the floor projection of the body, as visible in FIG. 2, this contour lying in a substantially horizontal plane $P_2P_2$ disposed near the base of the body.

The roof 4 of the passenger compartment, the windscreen 5 and the bonnet 6 are inclined forwards, as shown.

In the plane $P_1P_1$ the body panels form a sharp-edged shoulder 7 facing to the rear and covering the upper portion of the passenger compartment with lateral extensions on either side. The aeroflow extractors or vents 8 of the compartment are positioned just behind said shoulder 7.

The edge 9 connecting the passenger compartment to the rear window 10 forms slightly behind the shoulder 7 another sharp-edged shoulder substantially parallel thereto. The surfaces 11 formed between these two shoulders are inclined and converge to the rear. The surfaces 12, 13, 14 and 15 of the rear portion of the body are also strongly inclined and converge to the rear.

The surfaces 16 and 17 formed by the upper side panels of the front portion of the vehicle and of the passenger compartment are inclined upwards and converge in the forward direction, as shown.

When the vehicle is driven at high speed, an air pressure gradient develops along the surfaces 4, 5, 6, 16 and 17, of which the vertical component tends to press the vehicle against the road surface. Along the edge 7 a turbulence sheet develops which is reinforced by the action produced by the edge 9 between the surface 11 and the rear window 10, in order to break the air flows likely to exert a lift effect on the rear portion of the vehicle.

The lack of surface discontinuity outside the shoulders 7 and 9, and the gradual and continuous slopes of the body surface panels assist in imparting to the assembly a stable aerodynamic condition substantially insensitive to variations in environmental conditions.

As already pointed out hereinabove, various modifications may be brought to the body design and to its specific proportions as illustrated and described herein, without inasmuch departing from the spirit and scope of the invention as set forth in the appended claims.

What is claimed as new is:

1. A body of an automotive vehicle having a general configuration comprising two opposed irregular frustums of pyramids each having non-parallel bases, joined at their major bases, a first one of said frustums having an elongated shape converging toward the front of the vehicle to comprise a passenger compartment and the front portion of the vehicle, its minor base comprising the front face and its major base corresponding to the greater cross-section of the vehicle body which is located substantially at the rear of said passenger compartment, the second frustum being shorter than the first and converging sharply toward the rear of the vehicle, having a minor base which comprises the rear face of the vehicle and major base coplanar with the major base of the first frustum, the perimeter of this major base following a contour substantially parallel to that of the major base of said first frustum and being slightly smaller than and recessed in relation thereto in order to provide a continuous, sharp-edged shoulder along the perimeter of said major base on the faces corresponding to the roof and to the upper portion of the side panels of the body.

2. Vehicle body according to claim 1, wherein the body also comprises a third irregular frustum of a pyramid having non-parallel bases and a flattened configuration, with the minor base comprising the roof of the passenger compartment and the major base comprising the contour of the maximum surface area of the vehicle as seen in floor projection from above, said major base lying in a substantially horizontal plane close to the base or lower edge of the car body.

3. Vehicle body according to claim 1, wherein the surfaces comprising the top of the front portion, the windscreen, the roof of the passenger compartment, the upper portions of the side panels of the passenger compartment and of the front portion are inclined and converge in the forward direction.

4. Vehicle body according to claim 1, wherein aeroflow vents communicating with the passenger compartment are disposed in the recessed zone behind the sharp-edged shoulder.

5. Vehicle body according to claim 1, wherein the surface elements are slightly curved.

6. Vehicle body according to claim 1, wherein said body comprises the body of an automotive vehicle having at least four wheels.

7. Vehicle body according to claim 1, wherein the lines of the upper and side contours of the rear window form a sharp angle with the surfaces of the roof and of the side panels of the passenger compartment, and said window is substantially parallel to and slightly rearward of the contour of the sharp-edged shoulder at the common base of the two frustums which has the shape of said first and second opposed frustums of pyramids and comprises the maximum cross-section of the vehicle.

8. Vehicle body according to claim 7, wherein the surfaces formed rearward of the sharp-edged shoulders are inclined and converge to the rear.

* * * * *